US011436869B1

(12) United States Patent
Kirmani et al.

(10) Patent No.: US 11,436,869 B1
(45) Date of Patent: Sep. 6, 2022

(54) ENGAGEMENT DETECTION AND ATTENTION ESTIMATION FOR HUMAN-ROBOT INTERACTION

(71) Applicant: X Development LLC, Mountain View, CA (US)

(72) Inventors: Sean Kirmani, Mountain View, CA (US); Michael Quinlan, Sunnyvale, CA (US); Sarah Coe, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 331 days.

(21) Appl. No.: 16/707,835

(22) Filed: Dec. 9, 2019

(51) Int. Cl.
| | |
|---|---|
| *G06V 40/20* | (2022.01) |
| *B25J 9/16* | (2006.01) |
| *G05B 13/02* | (2006.01) |
| *G06V 10/40* | (2022.01) |
| *G06V 20/10* | (2022.01) |
| *G06V 40/10* | (2022.01) |

(52) U.S. Cl.
CPC .............. *G06V 40/23* (2022.01); *B25J 9/163* (2013.01); *B25J 9/1697* (2013.01); *G05B 13/0265* (2013.01); *G06V 10/40* (2022.01); *G06V 20/10* (2022.01); *G06V 40/103* (2022.01)

(58) Field of Classification Search
CPC ........... G06K 9/00342; G06K 9/00369; G06K 9/00664; G06K 9/46; B25J 9/163; B25J 9/1697; G05B 13/0265
See application file for complete search history.

(56) References Cited

PUBLICATIONS

Gaschler, A., Jentzsch, S., Giuliani, M., Huth, K., de Ruiter, J. and Knoll, A., Oct. 2012, Social behavior recognition using body posture and head pose for human-robot interaction. In 2012 IEEE/RSJ International Conference on Intelligent Robots and Systems (pp. 2128-2133). IEEE.*
A 2019 guide to human pose estimation with deep learning, Sudharshan Chandra Babu, Apr. 19, 2019.*
Reddy, N.D., Vo, M. and Narasimhan, S.G., 2019. Occlusion-net: 2d/3d occluded keypoint localization using graph networks. In Proceedings of the IEEE/CVF Conference on Computer Vision and Pattern Recognition (pp. 7326-7335).*

(Continued)

*Primary Examiner* — Zhitong Chen
(74) *Attorney, Agent, or Firm* — McDonnell Boehnen Hulbert & Berghoff LLP

(57) ABSTRACT

A method includes receiving, from a camera disposed on a robotic device, a two-dimensional (2D) image of a body of an actor and determining, for each respective keypoint of a first subset of a plurality of keypoints, 2D coordinates of the respective keypoint within the 2D image. The plurality of keypoints represent body locations. Each respective keypoint of the first subset is visible in the 2D image. The method also includes determining a second subset of the plurality of keypoints. Each respective keypoint of the second subset is not visible in the 2D image. The method further includes determining, by way of a machine learning model, an extent of engagement of the actor with the robotic device based on (i) the 2D coordinates of keypoints of the first subset and (ii) for each respective keypoint of the second subset, an indicator that the respective keypoint is not visible.

20 Claims, 10 Drawing Sheets

(56) References Cited

PUBLICATIONS

Ognjen (Oggi) Rudovic, Jaeryoung Lee, miles Dai, Bjorn Schuller and Rosalind W. Picard, Personalized Machine Learning For Robot Perception of Affect and Engagement in Autism Therapy, arXiv:1802. 1186v1 [cs.OR] Feb. 4, 2018.*

Hadfield E1 Al., A Deep Learning Approach for Multi-View Engagement Estimation of Children in a Child-Robot Joint Attention task, arXiv, Published Dec. 1, 2018, 7 Pages.

Foster Ei Al., Automatically Classifying User Engagement for Dynamic Multi-party Human-Robot Interaction, International Journal of Social Robotics, Published Jul. 20, 2017, 16 Pages.

Di Nuovo Ei Al., Deep Learning Systems for Estimating Visual Attention in Robot-Assisted Therapy of Children with Autism and Intellectual Disability, Robotics, Published Jun. 4, 2018, 21 Pages.

Figueroa-Angulo et al., Compound Hidden Markov Model for Activity Labelling, International Journal of ntelligence Science, Published Oct. 2015, 19 Pages.

Mollaret et al., A Multi-modal Perception based Assistive Robotic System for the Elderly, Computer Vision and mage Understanding, Published Mar. 2016, 42 Pages.

Qureshi et al., Show, Attend and Interact: Perceivable Human-Robot Social Interaction through Neural Attention O-Network, arXiv, Published Feb. 28, 2017, 7 Pages.

Rudovic Ei Al., Personalized machine learning for robot perception of affect and engagement in autism therapy, Science Robotics, Published Jun. 27, 2018, 21 Pages.

Rudovic Ei Al., Measuring Engagement in Robot-Assisted Autism Therapy: A Cross-Cultural Study, Frontiers in Robotics and AI, Published Jul. 2017, 17 Pages.

Bl GE, Detecting Engagement Levels For Autism Intervention Therapy Using RGB-D Camera, Georgia Institute of Technology Thesis, Published May 2016,49 Pages.

Khamassi Ei Al., Robot fast adaptation to changes in human engagement during simulated dynamic social nteraction with active exploration in parameterized reinforcement learning, IEEE Transactions On Cognitive And Developmental Systems, Published Jun. 2018,13 Pages.

Sidner et al., Explorations in engagement for humans and robots, Artifical Intelligence, Published May 17, 2005, 25 Pages.

Panteleris et al., Using a single RGB frame for real time 3D hand pose estimation in the wild, arXiv, Published Dec. 11, 2017, 10 Pages.

Noda et al., Multimodal integration learning of robot behavior using deep neural networks, Robotics and Autonomous Systems, Published Mar. 24, 2014, 16 Pages.

Nehta et al., Monocular 3D Human Pose Estimation In The Wild Using Improved CNN Supervision, arXiv, Oct. 4, 2017, 16 Pages.

Khamassi et al., A framework for robot learning during child-robot interaction with human engagement as reward signal, Proceedings of the 27th IEEE International Symposium on Robot and Human Interactive Communication, Published Aug. 27, 2018, 4 Pages.

Sudharshan Candra Babu, A 2019 guide to Human Pose Estimation with Deep Learning, Nanonets.com, Published Apr. 2019, 29 Pages, https://nanonets.com/blog/human-pose-estimation-2d-guide/.

* cited by examiner

ENGAGEMENT DETECTION AND ATTENTION ESTIMATION FOR HUMAN-ROBOT INTERACTION

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Robots may operate in coordination with humans. To facilitate such coordination, a control system of the robot may be configured to determine an extent of engagement of the human with the robot. Specifically, the robot may capture a two-dimensional (2D) image that represents the human, and the control system may identify therein a first subset of keypoints representing visible body locations. For each of these keypoints, the control system may determine the coordinates of the keypoint within the 2D image. The control system may also identify a second subset of keypoints that are not visible in the 2D image. The extent of engagement may then be determined by way of a machine learning model based on the coordinates of the first subset and an indication that keypoints of the second subset are not visible in the 2D image.

In a first example embodiment, a method is provided that includes receiving, by a control system of a robotic device and from a camera disposed on the robotic device, a two-dimensional (2D) image of a body of an actor. The method also includes determining, by the control system and for each respective keypoint of a first subset of a plurality of keypoints, 2D coordinates of the respective keypoint within the 2D image. The plurality of keypoints represent a corresponding plurality of predetermined body locations. Each respective keypoint of the first subset is visible in the 2D image. The method also includes determining, by the control system, a second subset of the plurality of keypoints. Each respective keypoint of the second subset is not visible in the 2D image. The method further includes determining, by the control system and by way of a machine learning model, an extent of engagement of the actor with the robotic device. The machine learning model is configured to determine the extent of engagement based on (i) the 2D coordinates of each respective keypoint of the first subset and (ii) for each respective keypoint of the second subset, an indicator that the respective keypoint is not visible in the 2D image.

In a second example embodiment, a system is provided that includes a robotic device, a camera disposed on the robotic device, and processing hardware of the robotic device configured to perform operations. The operations include receiving, from the camera, a 2D image of a body of an actor. The operations also include determining, for each respective keypoint of a first subset of a plurality of keypoints, 2D coordinates of the respective keypoint within the 2D image. The plurality of keypoints represent a corresponding plurality of predetermined body locations. Each respective keypoint of the first subset is visible in the 2D image. The operations additionally include determining a second subset of the plurality of keypoints. Each respective keypoint of the second subset is not visible in the 2D image. The operations further include determining, by way of a machine learning model, an extent of engagement of the actor with the robotic device. The machine learning model is configured to determine the extent of engagement based on (i) the 2D coordinates of each respective keypoint of the first subset and (ii) for each respective keypoint of the second subset, an indicator that the respective keypoint is not visible in the 2D image.

In a third example embodiment, a non-transitory computer readable storage medium is provided having stored thereon instructions that, when executed by a computing device, cause the computing device to perform operations. The operations include receiving, from a camera disposed on a robotic device, a 2D image of a body of an actor. The operations also include determining, for each respective keypoint of a first subset of a plurality of keypoints, 2D coordinates of the respective keypoint within the 2D image. The plurality of keypoints represent a corresponding plurality of predetermined body locations. Each respective keypoint of the first subset is visible in the 2D image. The operations additionally include determining a second subset of the plurality of keypoints. Each respective keypoint of the second subset is not visible in the 2D image. The operations further include determining, by way of a machine learning model, an extent of engagement of the actor with the robotic device. The machine learning model is configured to determine the extent of engagement based on (i) the 2D coordinates of each respective keypoint of the first subset and (ii) for each respective keypoint of the second subset, an indicator that the respective keypoint is not visible in the 2D image.

In a fourth example embodiment, a system is provided that includes means for receiving, from a camera disposed on a robotic device, a 2D image of a body of an actor. The system also includes means for determining, for each respective keypoint of a first subset of a plurality of keypoints, 2D coordinates of the respective keypoint within the 2D image. The plurality of keypoints represent a corresponding plurality of predetermined body locations. Each respective keypoint of the first subset is visible in the 2D image. The system additionally includes means for determining a second subset of the plurality of keypoints. Each respective keypoint of the second subset is not visible in the 2D image. The system further includes means for determining an extent of engagement of the actor with the robotic device based on (i) the 2D coordinates of each respective keypoint of the first subset and (ii) for each respective keypoint of the second subset, an indicator that the respective keypoint is not visible in the 2D image.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
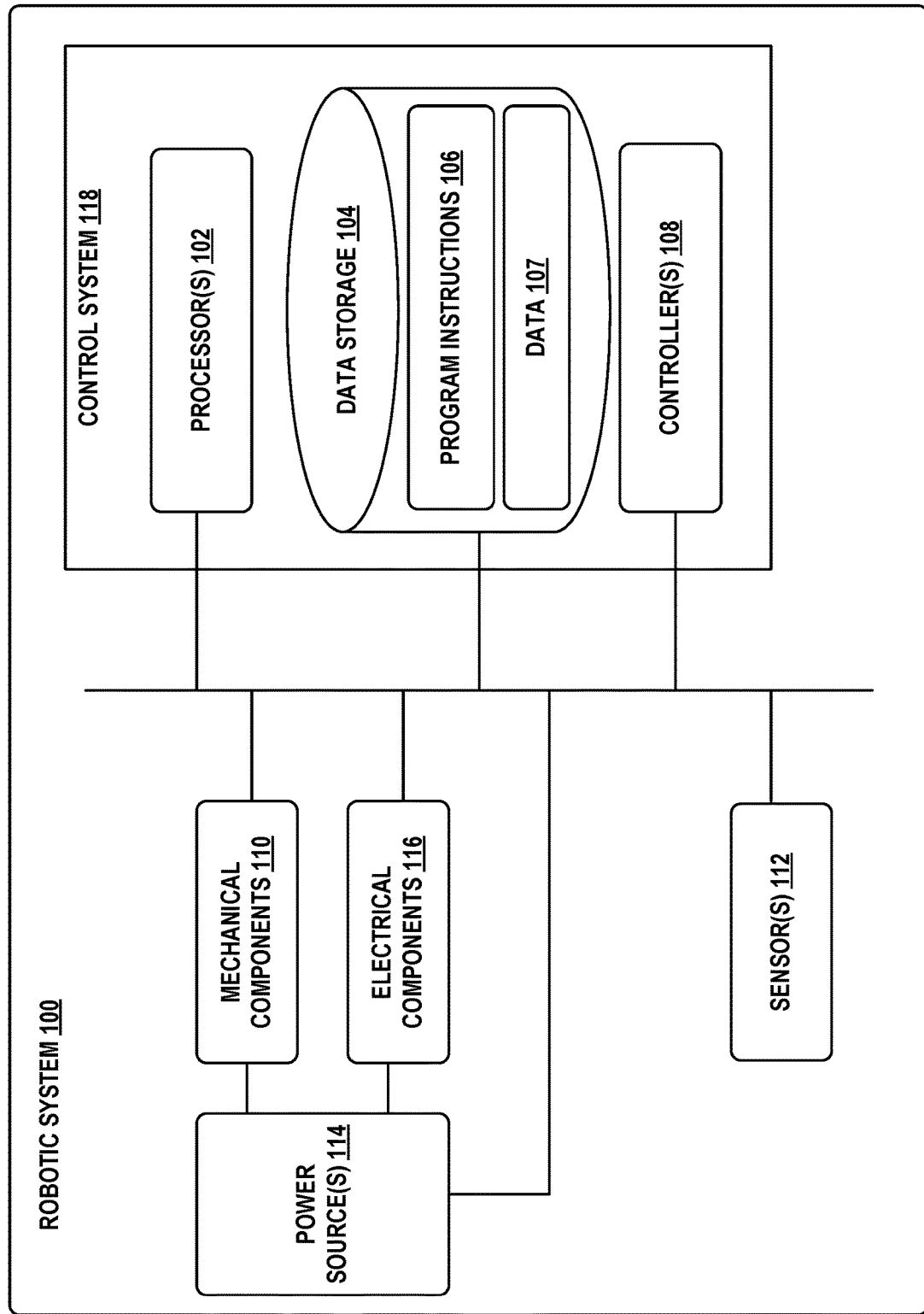
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

The use of robotic devices in various settings is becoming increasingly prevalent. In many of these settings, robots coordinate and/or cooperate with humans and other actors, including animals and other robots. Accordingly, it is becoming increasingly important for a robot to be aware of the intentions and expectations of these actors with respect to the robot. Thus, provided herein is a system for determining an extent or level of engagement of an actor with a robot based on cues exhibited by the actor. That is, the system allows the robot to determine whether a given actor intends to interact with the robot (e.g., an engaged state), intends to ignore the robot (e.g., a disengaged state), or is curious about the robot but not yet committed to an interaction therewith (e.g., a borderline state), among other possibilities. Based on this information, the robot may be able to develop a course of action to take with respect to the actor. For example, the robot may initiate and/or maintain interactions with engaged actors, and leave disengaged actors alone.

The extent of engagement of the actor may be determined based on two-dimensional (2D) image data captured by one or more cameras on the robot. Specifically, a control system of the robot may be configured to identify, within a given 2D image, a plurality of keypoints. Each keypoint may be a predetermined location on the body of the actor, and may be intended to be found, identified, and/or located in the 2D image of the body of the actor. In the case of a human, for example, the keypoints may include locations on legs (e.g., ankle, knee, and hip joints), arms (e.g., wrist, elbow, and shoulder joints), torso (e.g., pelvic and neck joints), and head of the human actor. Different implementations may omit some of these keypoints or include additional keypoints (e.g., the head may include keypoints for eyes, nose, mouth, and ears). The control system may identify two subsets of the plurality of keypoints. A first subset of the plurality of keypoints may include keypoints that are visible within the 2D image, while a second subset of the plurality of keypoints may include keypoints that are hidden, or not visible, within the 2D image.

For each respective keypoint of the first subset, the control system may determine coordinates of the respective keypoint within the 2D image. For each respective keypoint of the second subset, the control system may generate an indication that the respective keypoint is not visible. This information regarding the first and second subsets may be provided as input to a machine learning model configured to determine the extent of engagement of the actor represented by this information. That is, the ML model may be configured to estimate how engaged an actor is based on the actor's pose as represented through the identified keypoints, the keypoints' positions in the 2D image, and the keypoints' visibility in the 2D image. By explicitly identifying the keypoints that are hidden, the ML model may be trained to ignore these hidden keypoints, give greater weight to the visible keypoints, and/or extrapolate the positions of the hidden keypoints. In some implementations, the ML model may also be provided with an explicit indication that the visible keypoints are, in fact, visible in the 2D image, and/or an approximation of the coordinates of the hidden keypoints.

In some implementations, the ML model may additionally be configured to determine the extent of engagement based on data representing the depth of various portions of the 2D image. For example, the ML model may be configured to operate on depth images. Notably, however, operating on 2D images, rather than 3D images, may be more computationally efficient and, in some cases, more accurate and less noisy. Specifically, the 2D image may provide sufficient depth cues to accurately determine the extent of engagement while allowing for a simpler ML model to be used. For example, spacing between the visible keypoints and/or obstruction of some hidden keypoints by some visible keypoints may, among other cues, be indicative of the depth of parts of the scene in the 2D image.

Meanwhile, processing the 2D image may necessitate fewer model components than processing a 3D image. For example, when the ML model is implemented as an artificial neural network (ANN), an ANN configured to process the 2D image may include fewer input neurons and fewer hidden neurons than an ANN configured to process 3D images. Thus, the 2D ANN may be utilized by the robot more frequently than the 3D ANN while generating a given processing load. Accordingly, the 2D ANN may be more responsive and/or may allow the robot to dedicate some processing resources to other tasks. Additionally, processing 2D image data to identify therein the plurality of keypoints may utilize fewer computing resources than equivalent processing of 3D image data, thus freeing up yet additional processing resources for other tasks.

Further, depth cues in 2D images may be less noisy than the depth data of a 3D image, resulting in more accurate and less variable determination of the extent of engagement. Specifically, noise in the depth data may result in rapid changes in the determined positions of the keypoints between adjacent image frames. This, in turn, may result in rapid changes in the extent of engagement, making it difficult to determine appropriate operations for the robot. Yet further, extrapolations of the 2D coordinates of a hidden keypoint may be simpler and more accurate than extrapolations of the 3D coordinates of the hidden keypoint, as it may be difficult to estimate the depth of a hidden portion of the actor.

In some implementations, the ML model may be configured to determine the extent of engagement based on multiple sets of keypoint information corresponding to multiple 2D images. For example, the ML model may consider the last N (e.g., 8) captured 2D images and the keypoints identified therein in estimating the extent of engagement. Thus, the ML model may take into account the changes in position over time of a given keypoint, and the pose that such changes indicate. Similarly, in some cases, the ML model may be additionally configured to determine the extent of engagement of the actor based on speech generated by the actor (e.g., detected via a microphone on the robot or based on video data representing movement of the actor's lips and/or face), or a direction in which a gaze of the actor is pointed, among other inputs.

The 2D images used in determining the extent of engagement may be captured from the perspective of a camera on the robot. Accordingly, the ML model may be trained using training data that includes 2D images captured from a similar perspective, albeit possibly by different robots. The training data may include images taken with cameras at angular positions and heights that approximate the angular position and height of the camera expected to be used by the robot in the field.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components.

The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
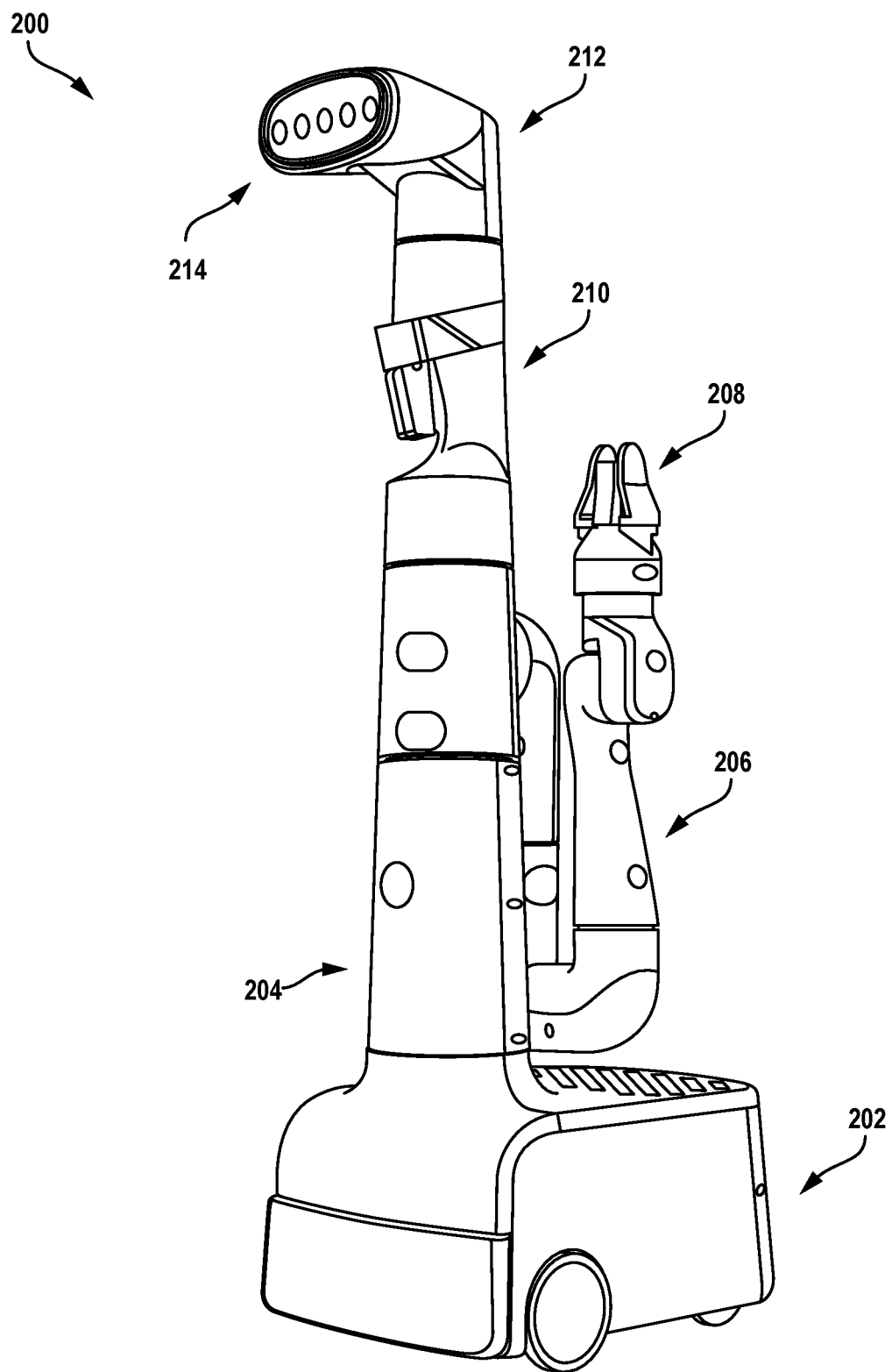
FIG. 2 illustrates a mobile robot, in accordance with example embodiments.
Figure 3:
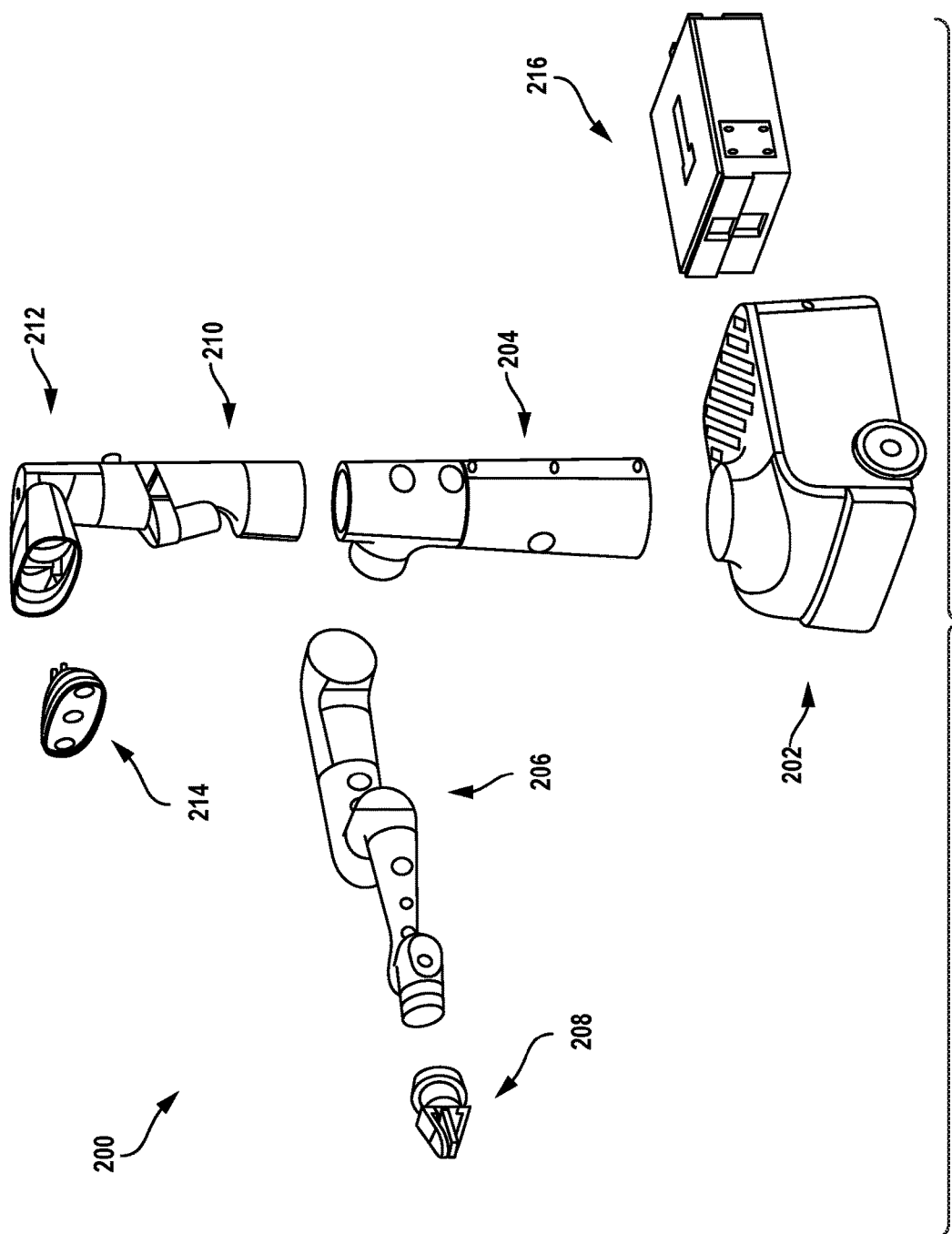
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, robot 200 may include mobile base 202, midsection 204, arm 206, end-of-arm system (EOAS) 208, mast 210, perception housing 212, and perception suite 214. Robot 200 may also include compute box 216 stored within mobile base 202.

Mobile base 202 includes two drive wheels positioned at a front end of robot 200 in order to provide locomotion to robot 200. Mobile base 202 also includes additional casters (not shown) to facilitate motion of mobile base 202 over a ground surface. Mobile base 202 may have a modular architecture that allows compute box 216 to be easily removed. Compute box 216 may serve as a removable control system for robot 200 (rather than a mechanically integrated control system). After removing external shells, compute box 216 can be easily removed and/or replaced. Mobile base 202 may also be designed to allow for additional modularity. For example, mobile base 202 may also be designed so that a power system, a battery, and/or external bumpers can all be easily removed and/or replaced.

Midsection 204 may be attached to mobile base 202 at a front end of mobile base 202. Midsection 204 includes a mounting column which is fixed to mobile base 202. Midsection 204 additionally includes a rotational joint for arm 206. More specifically, Midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide arm 206 with sufficient height to perform manipulation tasks at commonly encountered height levels (e.g., coffee table top and/or counter top levels). The length of the mounting column of midsection 204 may also allow the shoulder pitch J1 joint to rotate arm 206 over mobile base 202 without contacting mobile base 202.

Arm 206 may be a 7DOF robotic arm when connected to midsection 204. As noted, the first two DOFs of arm 206 may be included in midsection 204. The remaining five DOFs may be included in a standalone section of arm 206 as illustrated in FIGS. 2 and 3. Arm 206 may be made up of plastic monolithic link structures. Inside arm 206 may be housed standalone actuator modules, local motor drivers, and thru bore cabling.

EOAS 208 may be an end effector at the end of arm 206. EOAS 208 may allow robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

Mast 210 may be a relatively long, narrow component between the shoulder yaw J0 joint for arm 206 and perception housing 212. Mast 210 may be part of the stacked tower at the front of mobile base 202. Mast 210 may be fixed relative to mobile base 202. Mast 210 may be coaxial with midsection 204. The length of mast 210 may facilitate perception by perception suite 214 of objects being manipulated by EOAS 208. Mast 210 may have a length such that when the shoulder pitch J1 joint is rotated vertical up, a topmost point of a bicep of arm 206 is approximately aligned with a top of mast 210. The length of mast 210 may then be sufficient to prevent a collision between perception housing 212 and arm 206 when the shoulder pitch J1 joint is rotated vertical up.

As shown in FIGS. 2 and 3, mast 210 may include a 3D lidar sensor configured to collect depth information about the environment. The 3D lidar sensor may be coupled to a carved-out portion of mast 210 and fixed at a downward angle. The lidar position may be optimized for localization, navigation, and for front cliff detection.

Perception housing 212 may include at least one sensor making up perception suite 214. Perception housing 212 may be connected to a pan/tilt control to allow for reorienting of perception housing 212 (e.g., to view objects being manipulated by EOAS 208). Perception housing 212 may be a part of the stacked tower fixed to mobile base 202. A rear portion of perception housing 212 may be coaxial with mast 210.

Perception suite 214 may include a suite of sensors configured to collect sensor data representative of the environment of robot 200. Perception suite 214 may include an infrared (IR)-assisted stereo depth sensor. Perception suite 214 may additionally include a wide-angled red-green-blue (RGB) camera for human-robot interaction and context information. Perception suite 214 may additionally include a high resolution RGB camera for object classification. A face light ring surrounding perception suite 214 may also be included for improved human-robot interaction and scene illumination. In some examples, perception suite 214 may also include a projector configured to project images and/or video into the environment.

Figure 4:
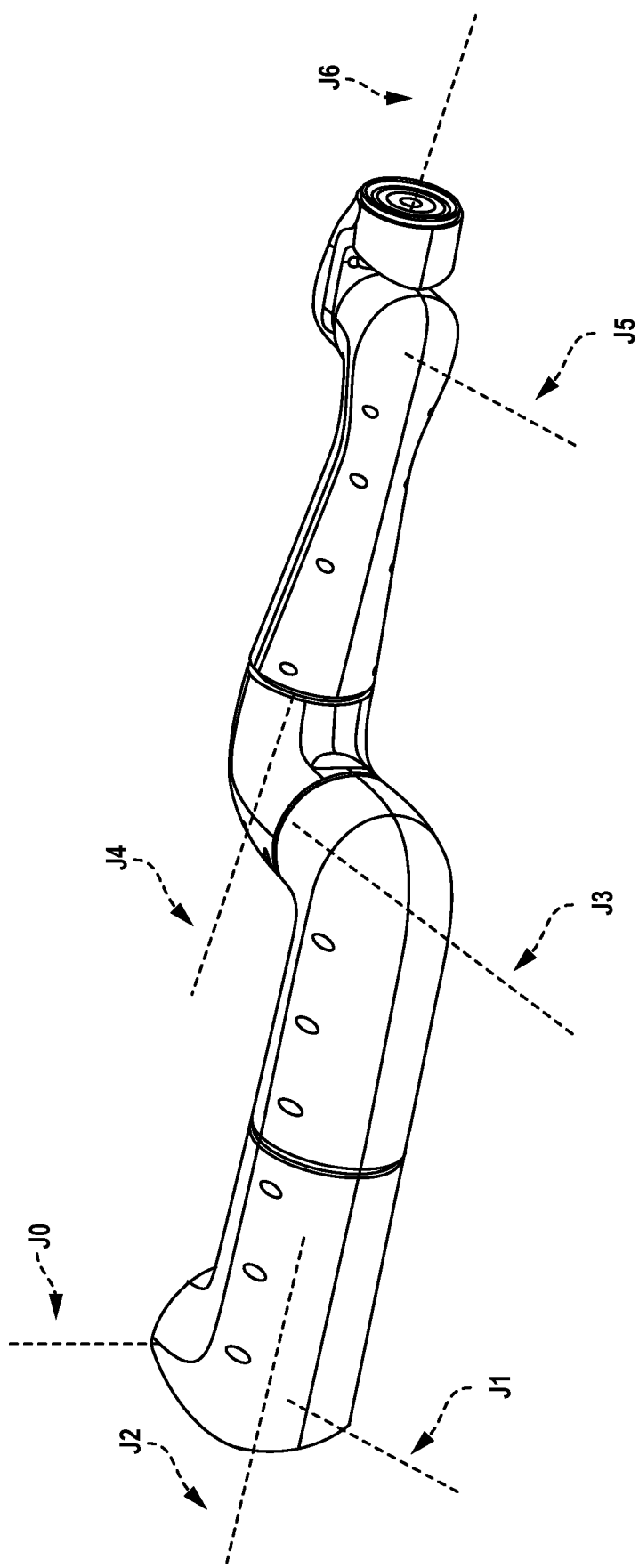
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

III. Example Engagement Detection Systems and Models

Figure 5:
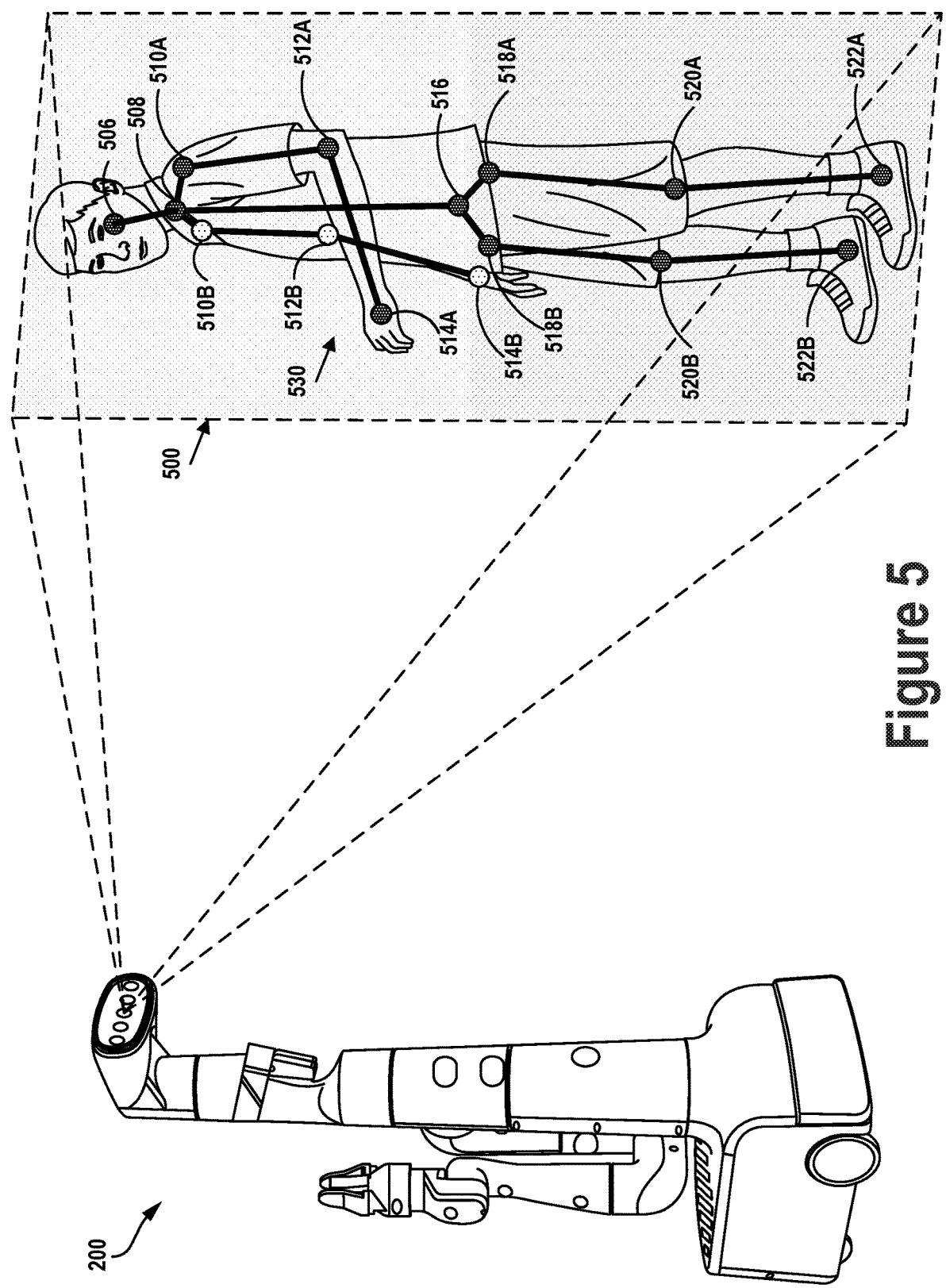
FIG. 5 illustrates a robot viewing an actor, in accordance with example embodiments.

FIG. 5 illustrates robot 200 capturing sensor data that represents actor 530, as indicated by field of view 500. Specifically, the sensor data may be captured by one or more sensors within perception suite 214. The sensor data may include two-dimensional (2D) images. The 2D images may be, for example, RGB-only images or grayscale images. Unlike three-dimensional (3D) images or other 3D sensor data, the 2D images do not represent a depth of the features contained in the images. The pose of perception suite 214 may be adjusted over time to capture sensor data regarding a specific portion of actor 530, increase the portion of actor 530 represented by the sensor data, and/or follow actor 530 as the position thereof changes over time.

Based on the captured sensor data, a control system of robot 200 (e.g., control system 118) may be configured to determine an extent of engagement between actor 530 and robot 200. The extent of engagement may be a measure of willingness and/or desire by actor 530 to interact with robot 200. For example, a high extent of engagement may be associated with a high probability that actor 530 will interact with robot 200, whereas a low extent of engagement may be associated with a high probability that actor 530 will ignore robot 200. The interaction may involve a number of different operations, including hand-over of an object between robot 200 and actor 530, cooperation between robot 200 and actor 530 on a particular task, and/or communication between robot 200 and actor 530, among other possible operations.

Specifically, the extent of engagement may be determined based on the locations of a plurality of keypoints within the 2D images captured by robot 200. When actor 530 is a human, the plurality of keypoints may represent predetermined locations on a human body, as shown in FIG. 5. These predetermined body locations may include head keypoint 506, neck keypoint 508, shoulder keypoints 510A and 510B, elbow keypoints 512A and 512B, hand keypoints 514A and 514B, pelvic keypoint 516, hip keypoints 518A and 518B, knee keypoints 520A and 520B, and foot keypoints 522A and 522B (i.e., keypoints 506-522B). Thus, at least a subset of keypoints 506-522B may include joints of the human body.

In some implementations, some of keypoints 506-522B may be omitted and/or other keypoints may be added. For example, pelvic keypoint 516 may be omitted. In another example, head keypoint 506 may be further subdivided into eye keypoints, a nose keypoint, a mouth keypoint, and/or ear keypoints, among other possibilities. Keypoints 506-522B are shown interconnected to form a virtual human skeleton. Further, keypoints 510B, 512B, and 514B are drawn with a different pattern than the other keypoints to indicate that keypoints 510B, 512B, and 514B are not visible (i.e., are hidden) when actor 530 is viewed from the perspective shown in FIG. 5.

Alternatively, in some implementations, the plurality of keypoints may represent predetermined locations on a robotic body, or predetermined locations on a body of an actor of a species other than human and which is also capable of interacting with robot 200. Thus, the number and positioning of the keypoints may vary according to the type of actor. Further, keypoints 506-522B may alternatively be referred to as nodes. In general, the plurality of keypoints may be predetermined body locations that the system is configured to attempt to find or identify in captured images.

Figure 6A:
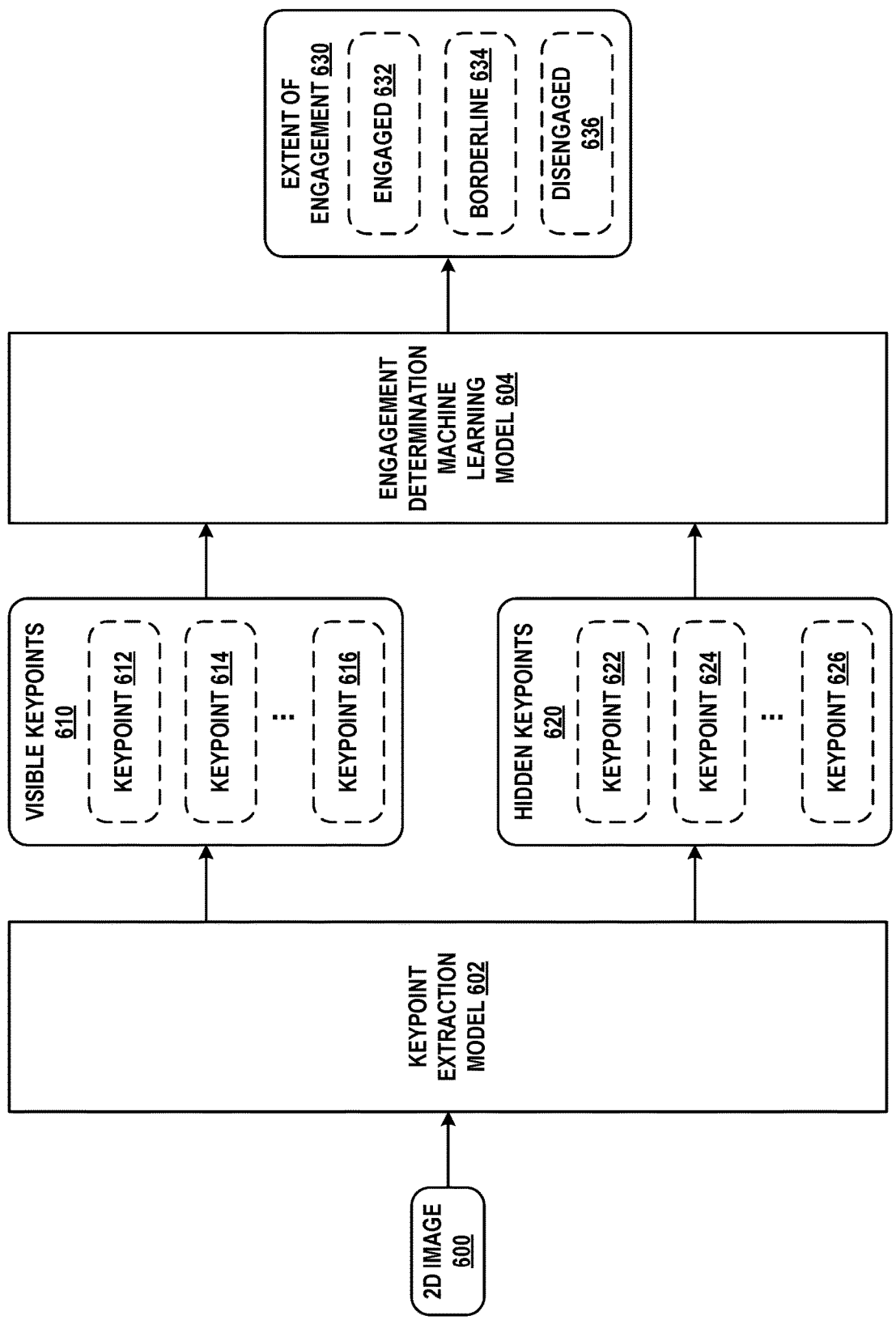
FIG. 6A illustrates a system for determining actor engagement, in accordance with example embodiments.

As illustrated in FIG. 6A, the control system may be configured to determine the extent of engagement by way of a machine learning model (i.e., engagement determination machine learning (ML) model 604). Specifically, keypoint extraction model 602 may be configured to receive 2D image 600 as input and identify therein the plurality of keypoints. The plurality of keypoints identified by model 602 may include visible keypoints 610 forming a first subset and hidden keypoints 620 forming a second subset. Keypoint extraction model 602 may implement one or more heuristic-based or machine learning algorithms such as, for example, OpenPose, DeepCut, AlphaPose, or Mask R-CNN.

Visible keypoints 610 may include keypoint 612 and keypoints 614 through 616 (i.e., keypoints 612-616), each of which is determined by model 602 to be visible in 2D image 600. Hidden keypoints 620 may include keypoint 622 and keypoints 624 through 626 (i.e., keypoints 622-626), each of which is determined by model 602 to be hidden (e.g., invisible or undetected) in 2D image 600. Keypoints 622-626 may be hidden due to parts of actor 530 not being represented in 2D image 600, parts of actor 530 being hidden behind other features of the environment represented in 2D image 600, and/or an orientation of actor 530 with respect to robot 200 resulting in some parts of actor 530 being obstructed by other parts of actor 530 (e.g., when robot 200 faces the side, rather than the front, of actor 530).

Each respective keypoint of keypoints 612-616 may indicate the coordinates of the respective keypoint within 2D image 600. Each respective keypoint of keypoints 622-626 may indicate that the respective keypoint is not visible within 2D image 600. In some implementations, each respective keypoint of keypoints 612-616 may additionally indicate the respective keypoint is visible within 2D image 600. In other implementations, each respective keypoint of keypoints 622-626 may indicate an approximation, determined by model 602, of coordinates of the respective keypoint within 2D image 600. Some or all of this information regarding visible keypoints 610 and hidden keypoints 620 may be provided as input to engagement determination ML model 604. Based on this input, ML model 604 may be configured to determine an extent of engagement 630.

Extent of engagement 630 may include at least an engaged state 632 and a disengaged state 636. The disengaged state 636 may indicate that actor 530 is not willing and/or interested in interacting with robot 200. In some implementations, extent of engagement 630 may also include a borderline state 634. Borderline state 634 may indicate that the pose of actor 530, as represented by the plurality of keypoints 610 and 620, does not indicate strong engagement or disengagement of actor 530 with robot 200. For example, borderline state 634 may indicate that actor 530 is indifferent about interacting with robot 200. Borderline state 634 may additionally or alternatively indicate a low confidence regarding the determination of engaged state 632 and/or disengaged state 636. Such a low confidence may be due to insufficient visible keypoints and/or due to actor 530 not exhibiting strong cues indicative of either engagement or disengagement.

In one example, the output generated by ML model 604 may be a value along a scale ranging from, for example, 0 to 100, where 0 represents complete disengagement and 100 represents complete engagement. This output of ML model 604 may be transformed into one of states 632, 634, or 636 based on threshold values separating engaged state 632 from borderline state 634 and borderline state 634 from disengaged state 636. For example, values above 66 may map to engaged state 632, values between and including 33 and 66 may map to borderline state 634, and values below 33 may map to disengaged state 636. In another example, the output of ML model 604 may be an explicit selection of one of the states 632, 634, and 636. Thus, any thresholds separating these states may be learned and applied by ML model 604 internally. In a further example, the output of ML model 604 may include probabilities associated with each of these three states.

In some cases, the output of ML model 604 may be averaged over multiple 2D images. For example, the extent of engagement at a given time may depend on a weighted moving average (e.g., exponential moving average) of the N most recent outputs of ML model 604. Such averaging may operate to filter our any high-frequency state transition, which may constitute outliers and/or errors, and smooth out the determined extent of interaction over time.

Notably, by relying on 2D images of an actor, ML model 604 may be more computationally efficient than another ML model that operates on more complex 3D representations of the actor. Specifically, in may cases, the 2D images may provide sufficient information to accurately determine the extent of engagement of the actor. The 2D images may include depth cues that can be used to approximate or substitute for explicit 3D information. For example, when actor 530 is far away from robot 200, visible keypoints 610 may be clustered together. On the other hand, when actor 530 is close to robot 200, visible keypoints 610 may be spread aparts. Similarly, when some hidden keypoints 620 are obstructed by body parts associated with some visible keypoints 610, these hidden keypoints may be determined to be further away than the obstructing visible keypoints. These and other 3D cues present in the 2D images may be learned by ML model 604 and used thereby to determine extent of engagement 630 without explicit reliance on 3D data.

Further, in some cases, the 3D cues present in the 2D images may be less noisy that depth data, thus allowing ML model 604 to generate extent of engagement 630 that is less noisy and more stable over time. Specifically, the 2D coordinates of keypoints determined from 2D images may fluctuate between frames to a lesser extent than 3D coordinates of keypoints determined from 3D sensor data. Stable determinations of extent of engagement 630 may allow robot 200 to plan operations that accurately match the actual engagement of actor 530, resulting in a better user experience.

Additionally, operating on 2D data, rather than 3D data, may result in a simplified ML model. For example, when ML model 604 is a neural network, the network may include fewer layers and/or nodes, thus reducing the amount of computation involved in processing each input. Accordingly, execution of ML model 604 by robot 200 might not necessitate a significant amount of computing resources. In some cases, this may allow ML model 604 to continuously run on robot 200 without affecting the ability of robot 200 to execute other computational tasks. For example, ML model 604 may process every captured 2D image or every ith captured 2D image to periodically monitor the environment for actors seeking to engage with robot 200. On the other hand, an ML model configured to operate on 3D image data might necessitate a larger amount of computing resources. Such an ML model might be allowed to, for example, process every jth frame, where j is greater than i, so that execution of the ML model does not prevent other computational tasks from being executed.

While operating on 2D images may be more computationally efficient, ML model 604 may, in alternative embodiments, be configured to also consider depth information associated with the plurality of keypoints. For example, ML model 604 may determine extent of engagement 630 based on RGB-Depth image data. Additionally, ML model 604 may also be configured to determine extent of engagement 630 based on additional input data such as, for example, an utterance by actor 530 detected by a microphone on robot 200, a visual indication within the 2D image that actor 530 is speaking, or a direction (e.g., represented by a 2D or 3D vector) in which a gaze of actor 530 is pointed, among others.

As mentioned above, 2D image 600 may be captured by an image sensor disposed on robot 200. Thus, 2D image 600 may represent actor 530 from a perspective of robot 200, rather than some third-person perspective (e.g., of a sensor disposed in the environment). The perspective of robot 200 may provide a constant frame of reference for the operations of model 602 and ML model 604. This constant frame of reference allows ML model 604 to be trained for the specific task of determining extent of engagement 630 based on how the poses of actor 530 is perceived by robot 200, rather than how the poses of actor 530 and robot 200 are perceived from the third-person perspective. Therefore, ML model 604 need not consider information about the pose of robot 200, making ML model 604 and its execution simpler and more efficient.

To that end, ML model 604 may be trained to determine the extent of engagement using training 2D images representing various actors from the perspective of a first camera on robot 200 or the perspectives of other cameras on other similar robots. Each respective image of the training 2D images may be associated with a label indicating a corresponding extent of engagement (e.g., expressed as a state of engagement or as a value within a range that may be mapped to a state of engagement). Further, each camera of the other cameras used to generate the training data may approximate the perspective of the camera of robot 200. For example, a second camera disposed on a second robot may approximate the perspective of the first camera by being positioned on the second robot within a threshold angular displacement relative to an angular position of the first camera on robot 200 and/or within a threshold height relative to a height of the first camera on robot 200. By increasing the threshold angular displacement and/or the threshold height represented within the training 2D images, ML model 604 may be trained to be usable with a wider range of robot sizes (e.g., robots smaller than and/or larger than a human).

The extent or state of engagement determined by ML model 604 may be used by the control system to determine operations for interacting with actor 530. These operations may include actions to be performed by robot 200 to engage with actor 530, ignore actor 530, and/or remain indifferent, but open to, an interaction with actor 530. For example, when actor 530 is determined to be engaged with robot 200, robot 200 may be configured to communicate with actor 530 and/or physically cooperate with actor 530 on a task. The task may include, for example, handing an object to actor 530, receiving an object from actor 530, or interacting with an object with which actor 530 is also interacting (e.g., assembling a vehicle).

In another example, when actor 530 is determined to be disengaged from robot 200, robot 200 may be configured to navigate around actor 530 without initiating an interaction therewith (e.g., when passing by actor 530 in a hallway). In another example, when actor 530 is determined to be at a borderline level of engagement with robot 200, robot 200 may be configured to acknowledge actor 530 (e.g., say "hello"), but otherwise operate independently of the actor. As the extent of engagement changes over time, the actions of robot 200 toward actor 530 may change as well, thus allowing robot 200 to be responsive to the actions of actor 530.

The extent of engagement determined by ML model 604 may be used to determine a start point of an interaction of actor 530 with robotic 200 and/or an end point of the interaction. ML model 604 may thus assist with identifying a time window during which robot 200 may interact with actor 530, and outside of which robot 200 is not to interact with actor 530.

ML model 604 may also be used in combination with multiple actors present within a shared scene or environment. Specifically, ML model 604 may be used to determine the extent of engagement for each of a plurality of actors represented by the 2D images. Based on the relative level of engagement of each of these actors, robot 200 may interact with and/or orient itself in the direction of one of the actors. For example, robot 200 may face the actor that exhibits the highest level of engagement, and may direct its actions and utterances towards that actor. In another example, when multiple actors exhibit levels of engagement falling within a predefined threshold of one another, robot 200 may periodically change its orientation to distribute its attention among these actors.

IV. Example ML Model

Figure 6B:
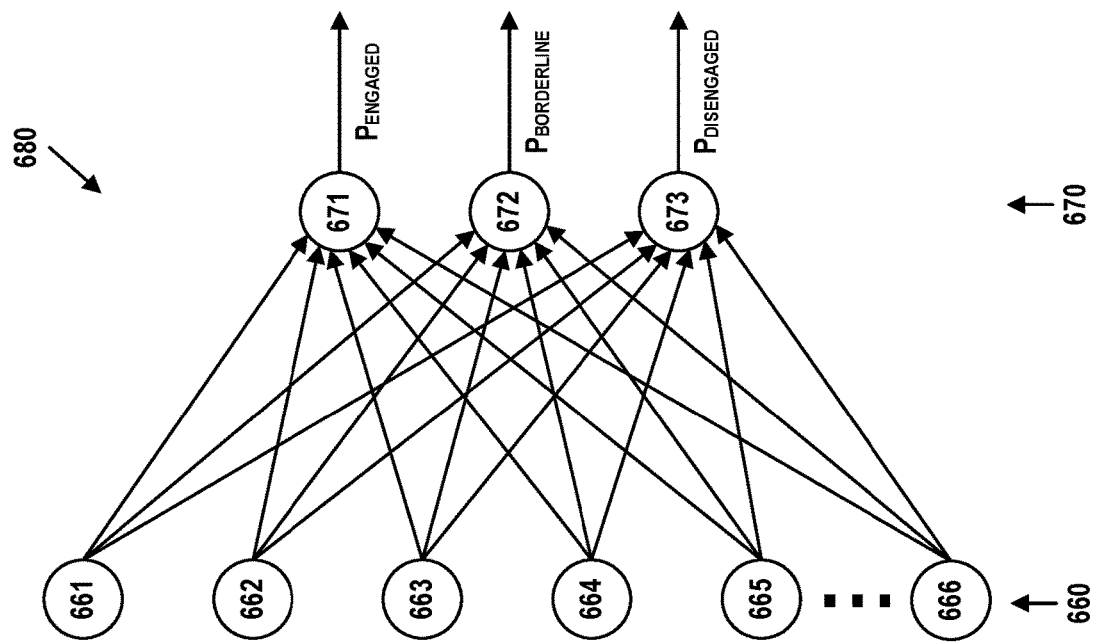
FIG. 6B illustrates a neural network, in accordance with example embodiments.
Figure 6B:
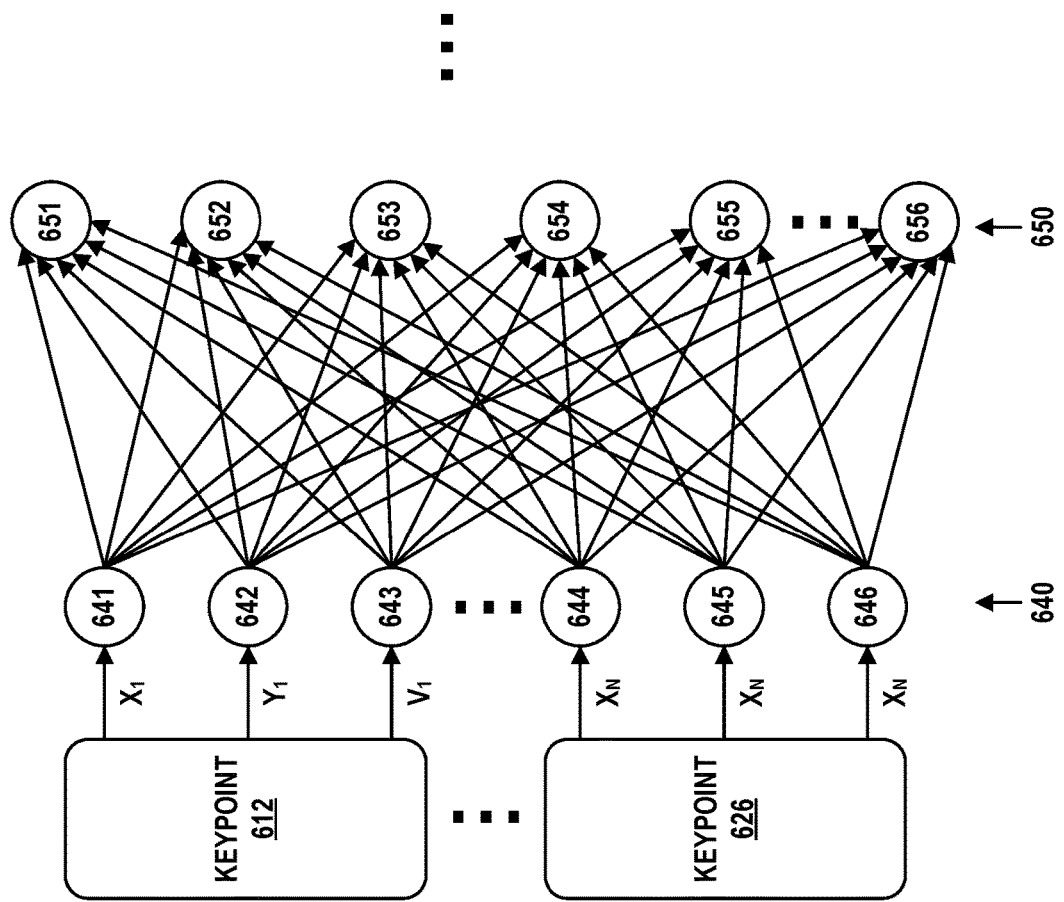

FIG. 6B illustrates an example implementation of ML model 604. Specifically, FIG. 6B illustrates ML model 604 implemented as artificial neural network (ANN) 680. ANN 680 includes input layer 640, hidden layers 650 through 660, and output layer 670. Input layer 640 includes input neurons 641, 642, 643, 644, and 645 through 646. Hidden layer 650 includes neurons 651, 652, 653, 654, and 655 through 656. Hidden layer 660 includes neurons 661, 662, 663, 664, and 665 through 666. Output layer 670 includes neurons 671, 62, and 673. A given neuron may be configured to compute a weighted sum of outputs of the neurons in a preceding layer and apply an activation function to this computed sum, thereby generating an output of the given neuron.

The information associated with each respective keypoint of visible keypoints 610 and hidden keypoints 620 may be provided as input to corresponding input neurons. Specifically, each respective keypoint may include (i) an x-coordinate of the respective keypoint within the 2D image, (ii) a y-coordinate of the respective keypoint within the 2D image, and (iii) an indicator of whether the respective keypoint is visible in the 2D image. The indicator of whether the respective keypoint is visible in the 2D image may be a binary variable. The binary variable may be set to a first value when the keypoint is visible and may be set to a second value when the keypoint is not visible.

For example, keypoint 612, determined to be visible, may provide (i) value $X_1$ to input neuron 641, (ii) value $Y_1$ to input neuron 642, and (iii) value $V_1$ to input neuron 643. Value $X_1$ may be an x-coordinate of keypoint 612 within 2D image 600, value $Y_1$ may be a y-coordinate of keypoint 612 within 2D image 600, and value $V_1$ may be equal to 1 (rather than 0) to indicate that keypoint 612 is visible in 2D image 600. Similarly, keypoint 626, determined to be hidden, may provide (i) value $X_N$ to input neuron 644, (ii) value $Y_N$ to input neuron 645, and (iii) value $V_N$ to input neuron 646. Value $X_N$ may be an x-coordinate of keypoint 626 within 2D image 600, value $Y_N$ may be a y-coordinate of keypoint 626 within 2D image 600, and value $V_N$ may be equal to 0 (rather than 1) to indicate that keypoint 626 is not visible in 2D image 600.

When value $V_k$ of a kth keypoint is 0, indicating that the kth keypoint is hidden, and when values $X_k$ and $Y_k$ do not represent an approximation of the position of the hidden keypoint, values $X_k$ and $Y_k$ may be ignored by ANN 680. ANN 680 may, through the training process, learn to extrapolate the coordinates of the kth keypoint based on the coordinates of other visible keypoints, and consider these extrapolated coordinates in determining the actor's level of engagement. In other implementations, when value $V_k$ of a kth keypoint is 0 and when values $X_k$ and $Y_k$ represent an approximation (e.g., computed by model 602) of the position of the hidden keypoint, values $X_k$ and $Y_k$ may instead be given lower weights by ANN 680 than visible keypoints. In either implementation, ANN 680 may be configured to account for the fact that the coordinates of visible keypoints 610 may be more accurate than any coordinates of hidden keypoints 620.

ANN 680 may be configured to generate (i) at output neuron 671 a first value indicating a probability of the actor represented in 2D image 600 being in the engaged state, $P_{ENGAGED}$, (ii) at output neuron 672 a second value indicating a probability of the actor being in the borderline state, $P_{BORDERLINE}$, and (iii) at output neuron 673 a third value indicating a probability of the actor being in the disengaged state, $P_{DISENGAGED}$. In such an implementation, extent of engagement 630 may be determined by selecting from neurons 671-673 the neuron with the highest probability. In alternative implementations, output layer 670 may instead be structure to, for example, generate a single value within a predetermined range, as discussed above.

In an alternative implementation, each respective keypoint of the plurality of keypoints may instead utilize two input neurons. Specifically, the coordinates of kth keypoint in the 2D image may be indicated by values $X_k$ and $Y_k$, as described above, but without utilizing the value $V_k$ to indicate the kth point's visibility. Instead, when the kth keypoint is hidden, the values $X_k$ and $Y_k$ may be set to a predetermined combination. For example, values $X_k$ and $Y_k$ may be set to a combination that falls outside of the 2D image (e.g., $X_k$=1921 and $Y_k$=1081 for a 1920 by 1080 2D image). Notably, however, by utilizing the value $V_k$, rather than the values $X_k$ and $Y_k$, to indicate the kth point's visibility, ANN 680 may be allowed to receive as input an approximation or extrapolation of the coordinates of a hidden keypoint.

V. Example Transition Hysteresis

Figure 7:
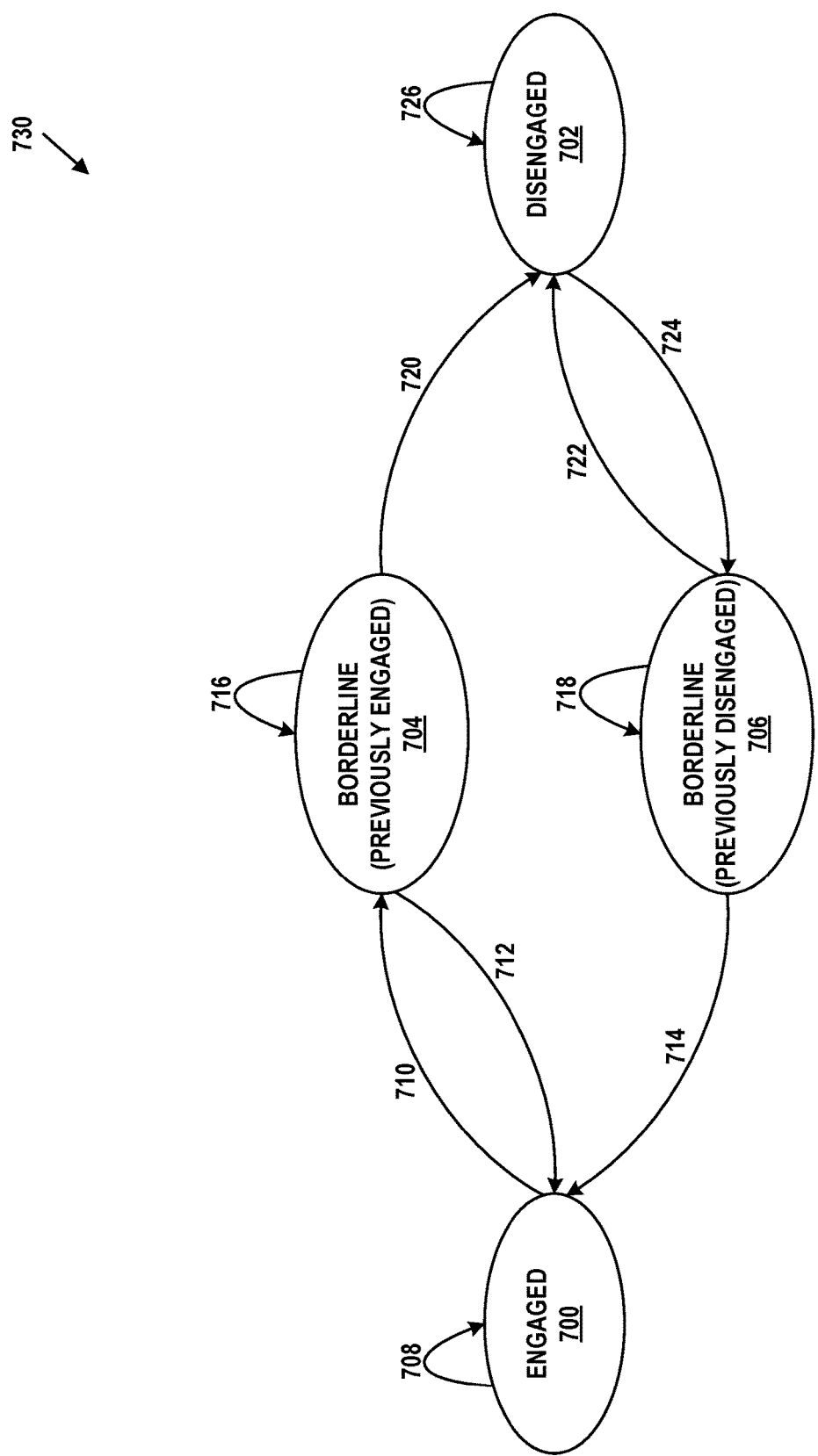
FIG. 7 illustrates a state transition diagram, in accordance with example embodiments.

FIG. 7 illustrates an example state transition diagram that may be used to determine a state of engagement of an actor with a robot. Specifically, state transition diagram 730 may be used in combination with the results generated by ML model 604 to determine a next engagement state based on a prior engagement state and/or a current engagement state. State transition diagram 730 includes engaged state 700 (e.g., corresponding to state 632), disengaged state 702 (e.g., corresponding to state 636), and borderline states 704 and 706 (e.g., corresponding to state 634). Borderline state 704 further indicates that the previous state was engaged state 702, while borderline state 706 further indicates that the previous state was disengaged state 704.

Transitions between states 700, 702, 704, and 706 are indicated with corresponding arrows. Specifically, transition 708 indicates robot 200 remaining in engaged state 700, transition 716 indicates robot 200 remaining in borderline state 704, transition 718 indicates robot 200 remaining in borderline state 706, and transition 726 indicates robot 200 remaining in disengaged state 702. Further, transition 710 indicates robot 200 transitioning from engaged state 700 to borderline state 704, transition 712 indicates robot 200 transitioning from borderline state 704 to engaged state 700, transition 714 indicates robot 200 transitioning from borderline state 706 to engaged state 700, transition 720 indicates robot 200 transitioning from borderline state 704 to disengaged state 702, transition 724 indicates robot 200 transitioning from disengaged state 702 to borderline state 706, and transition 722 indicates robot 200 transitioning from borderline state 706 to disengaged state 702.

Each transition may be associated with a corresponding bias or weight that (i) favors the transition, (ii) does not affect the transition, or (iii) opposes the transition. In one example, the weight of a transition may be multiplied by a corresponding output of ML model 604 to arrive at a transition decision. For example, when the current state of the robot 200 is borderline state 704 (and the prior state is thus engaged state 700), $P_{ENGAGED}$ may be multiplied by the weight associated with transition 712, $P_{BORDERLINE}$ may be multiplied by the weight associated with transition 716, and $P_{DISENGAGED}$ may be multiplied by the weight associated with transition 720. In another example, when the current state of the robot 200 is engaged state 700, $P_{ENGAGED}$ may be multiplied by the weight associated with transition 708, $P_{BORDERLINE}$ may be multiplied by the weight associated with transition 710, and $P_{DISENGAGED}$ may be multiplied by 0 (since no transition from state 700 to state 702 is permitted by diagram 730).

The bias or weight of each transition may be used to add hysteresis to the transitions and/or act as a filter to reduce the effects of flicker (i.e., rapid changes) in the output of ML model 604. In one example, each of transitions, 708, 716, 718, 726, 710, and 724 may be biased in favor of the transition (e.g., have a transition weight >1), thus favoring the next state being equal to the current state. This type of bias may act as a filter that reduces flicker by operating to keep robot 200 in the same state.

In another example, transitions 712, 720, 722, and 714, may be biased. Specifically, borderline state 706 may be biased in favor of transition 714 (e.g., weight of transition 714>1) and/or against transition 722 (e.g., weight of transition 722<1). This bias may favor a progression from borderline state 706 to engaged state 700, and reflects, for example, a situation where an actor becomes increasingly engaged with robot 200 as an interaction unfolds after an initial encounter. Similarly, borderline state 704 may be biased in favor of transition 720 (e.g., weight of transition 702>1) and/or against transition 712 (e.g., weight of transition 712<1). This bias may favor a progression from borderline state 704 to disengaged state 702, and reflects, for example, a situation where an actor is becoming less engaged with robot 200 as an interaction is coming to an end. Viewed another way, the biases of these transitions operate to create a momentum that facilitates transitions that are more common in human interactions.

VI. Example Multi-Frame Engagement Detection Model

Figure 8:
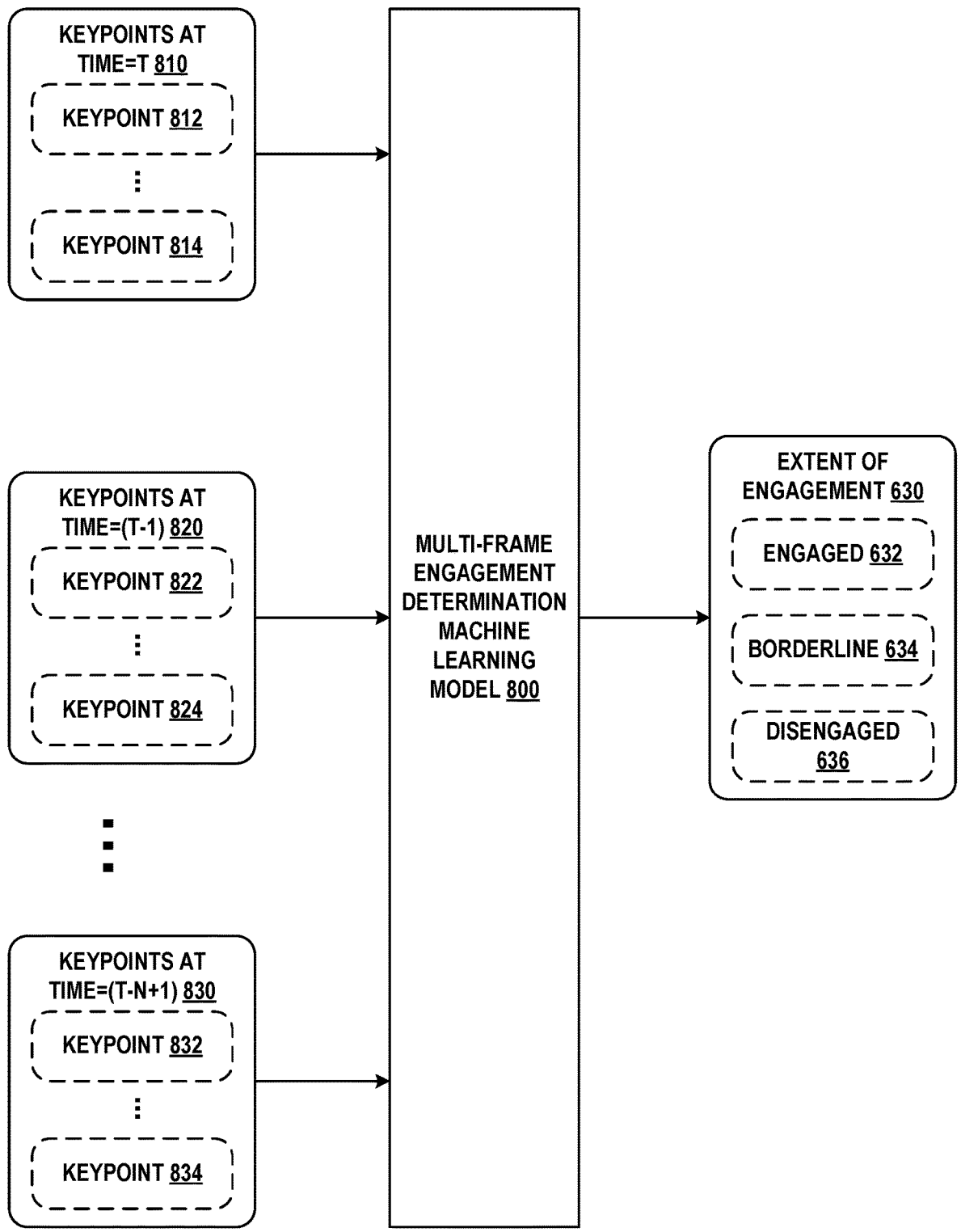
FIG. 8 illustrates a model for determining actor engagement, in accordance with example embodiments.

FIG. 8 illustrates an example model that is configured to determine extent of engagement 630 based on a plurality of sets of keypoints. Specifically, multi-frame engagement determination machine learning model 800 may be configured to operate on keypoints identified in a plurality of 2D images captured over time. For example, ML model 800 may be configured to receive as input keypoints 810, including keypoints 812 through 814, corresponding to a first 2D image captured at time=T, keypoints 820, including keypoints 822 through 824, corresponding to a second 2D image captured at time=(T−1), keypoints corresponding to a third 2D image captured at time=(T−2), and so on until keypoints 830, including keypoints 832 through 834, corresponding to a fourth 2D image captured at time=(T−N+1).

Accordingly, ML model 800 may be configured to determine extent of engagement 630 based on how the coordinates and visibility of the plurality of keypoints change over time. The number of frames N considered by ML model 800 may vary, ranging from, for example, 2 to 10 frames. ML model 800 may be used in place of ML mode 604.

ML model 800 may be implemented as a long short-term memory neural network (LSTM), a recurrent neural network (RNN), and/or a feed-forward ANN. In the case of an LSTM, for example, each set of keypoints may be provided to the LSTM once. The LSTM may be configured to preserve relevant information from prior determinations of the extent of engagement and use this information as input in subsequent determinations. For example, keypoints 810 may be provided as input to the LSTM once, and information derived therefrom may be automatically carried forward by the LSTM over time. Further, the LSTM may be configured to dynamically vary the number of preceding frames considered in each engagement determination based on the informational content of these frames. Similarly, an RNN may be capable of receiving each set of keypoint information once, and propagating relevant portions of this information across time.

On the other hand, in the case of the feed-forward ANN implementation, each of the plurality of sets of keypoint information may be provided as input for each iteration of the computation of extent of engagement 630. Thus, the feed-forward ANN may be configured with a number of input neurons equal to 3Nk, where N represents the number of 2D images frames (current 2D image+several preceding 2D images) used in the computation, where k represents the maximum number of keypoints that model 602 is configured to extract, and the factor of 3 assumes an input structured as illustrated in FIG. 6B.

Specifically, a first set of input neurons may receive keypoint data associated with time=t, a second set of input neurons may receive keypoint data associated with time=(t−1), and so on until the nth set of input neurons configured to receive keypoint data associated with time=(t−n+1). Thus, as new keypoint data becomes available over time, a given set of keypoint data may be provided to a different set of input neurons to indicate the given set's temporal relationship to other sets of keypoints.

VII. Additional Example Operations

Figure 9:
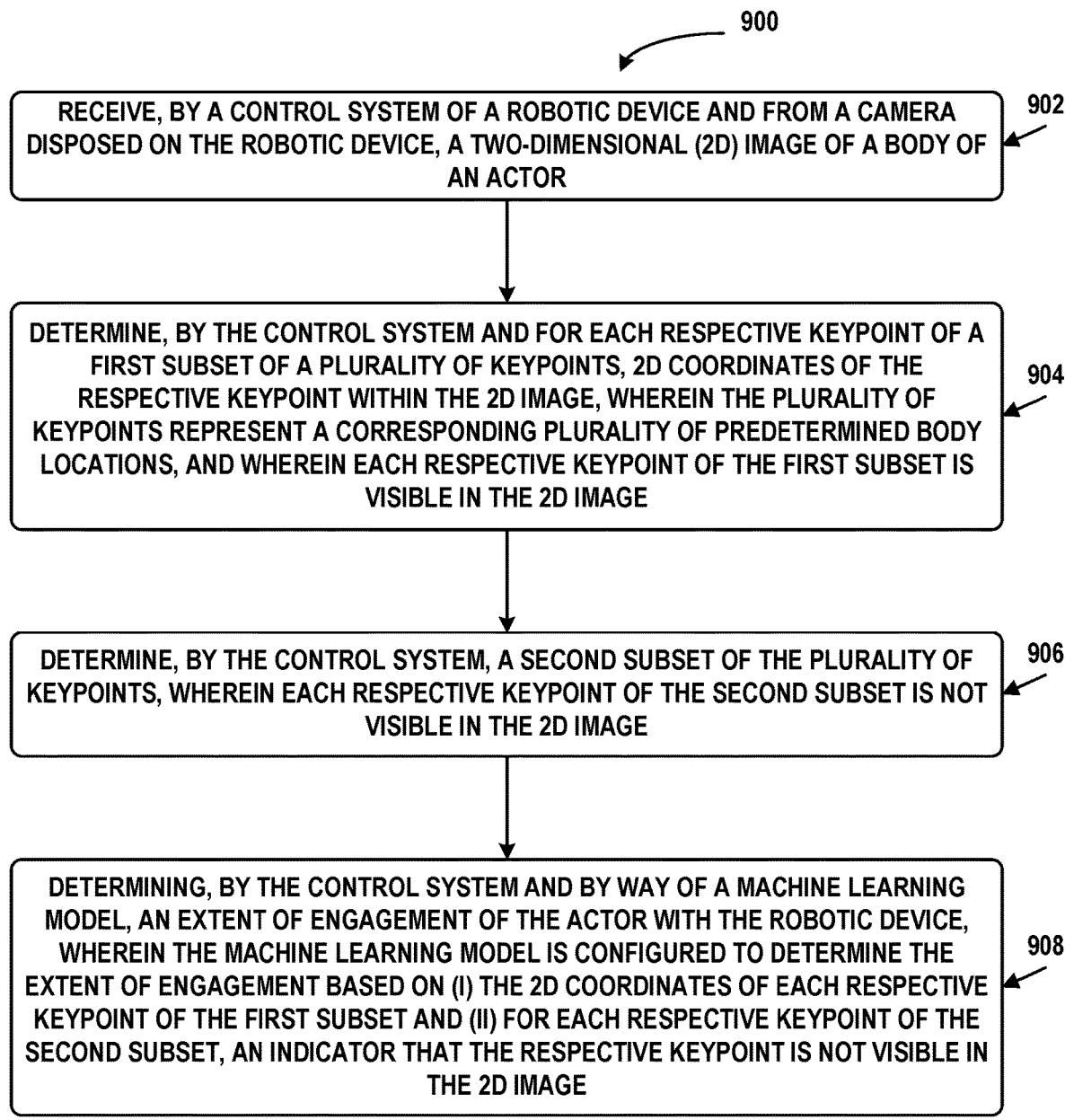
FIG. 9 illustrates a flow chart, in accordance with example embodiments.

FIG. 9 illustrates flow chart 900 of operations related to determining an engagement level of an actor. The operations may be carried out by robotic system 100 and/or robot 200, among other possibilities. The embodiments of FIG. 9 may be simplified by the removal of any one or more of the features shown therein. Further, these embodiments may be combined with features, aspects, and/or implementations of any of the previous figures or otherwise described herein.

Block 902 involves receiving, by a control system of a robotic device and from a camera disposed on the robotic device, a 2D image of a body of an actor.

Block 904 involves determining, by the control system and for each respective keypoint of a first subset of a plurality of keypoints, 2D coordinates of the respective keypoint within the 2D image. The plurality of keypoints may represent a corresponding plurality of predetermined body locations. Each respective keypoint of the first subset is visible in the 2D image.

Block 906 involves determining, by the control system, a second subset of the plurality of keypoints. Each respective keypoint of the second subset is not visible in the 2D image.

Block 908 involves determining, by the control system and by way of a machine learning model, an extent of engagement of the actor with the robotic device. The machine learning model may be configured to determine the extent of engagement based on (i) the 2D coordinates of each respective keypoint of the first subset and (ii) for each respective keypoint of the second subset, an indicator that the respective keypoint is not visible in the 2D image.

In some embodiments, the machine learning model may be configured to determine the extent of engagement further based on, for each respective keypoint of the first subset, an indicator that the respective keypoint is visible in the 2D image.

In some embodiments, the indicator that the respective keypoint of the second subset is not visible in the 2D image may include a binary variable set to a first value. The indicator that the respective keypoint of the first subset is visible in the 2D image may include the binary variable set to a second value.

In some embodiments, the indicator that the respective keypoint of the second subset is not visible in the 2D image may include 2D coordinates of the respective keypoint set to a predetermined value that corresponds to a position outside of the 2D image.

In some embodiments, the machine learning model may be trained to determine the extent of engagement based on a plurality of training 2D images of a plurality of actors. Each respective training image of the plurality of training 2D images may be associated with a label indicating a corresponding extent of engagement. Each respective image may be captured by the camera or a second camera disposed on a second robotic device. The second camera may approximate a perspective of the camera by being positioned on the second robotic device (i) within a threshold angular displacement relative to an angular position of the camera on the robotic device and (ii) within a threshold height relative to a height of the camera on the robotic device.

In some embodiments, based on the extent of engagement of the actor with the robotic device, one or more operations to perform by the robotic device to interact with the actor may be determined. The one or more operations may be executed.

In some embodiments, based on the extent of engagement of the actor with the robotic device, at least one of (i) a start point of an interaction of the actor with the robotic device or (i) an end point of the interaction may be determined.

In some embodiments, the 2D image may also represent a second body of a second actor. A second extent of engagement of the second actor with the robotic device may be determined by way of the machine learning model. The extent of engagement of the second actor with the robotic device may be compared to the extent of engagement of the actor with the robotic device. Based on results of the comparing, a direction in which to orient the robotic device may be determined.

In some embodiments, the extent of engagement of the actor with the robotic device may include an engaged state, a borderline state, and a disengaged state.

In some embodiments, based on the extent of engagement of the actor with the robotic device, a transition from a current state to a next state may be determined. When the current state is the borderline state, a probability of transition to the next state may be conditioned on a prior state such that (i) when the prior state is the engaged state, the next state may be biased towards being the disengaged state and (ii) when the prior state is the disengaged state, the next state may be biased towards being the engaged state.

In some embodiments, when the extent of engagement of the actor with the robotic device is the borderline state, the robotic device may be caused to perform an operation indicating an intent to interact with the actor.

In some embodiments, receiving the 2D image of the body of an actor may include obtaining a first 2D image representing a first subset of the body of the actor. Receiving the 2D image of the body of an actor may also include, based on the first 2D image, adjusting a pose of the camera to capture a second subset of the body of the actor. The second subset may be greater than the first subset. Receiving the 2D image of the body of an actor may further include capturing a second 2D image that represents the second subset of the body of the actor.

In some embodiments, the machine learning model may be configured to determine the extent of engagement further based on one or more of: (i) an utterance by the actor detected by a microphone on the robotic device, (ii) a visual indication within the 2D image that the actor is speaking, or (iii) a direction in which a gaze of the actor is pointed.

In some embodiments, the 2D image may be a first 2D image. A second 2D image of the body of the actor may be received from the camera. The second 2D image may be captured after the first 2D image. For each respective keypoint of a third subset of the plurality of keypoints, 2D coordinates of the respective keypoint within the second 2D image may be determined. Each respective keypoint of the third subset may be visible in the second 2D image A fourth subset of the plurality of keypoints may be determined. Each respective keypoint of the fourth subset might not be visible in the second 2D image. A second extent of engagement of the actor with the robotic device may be determined by way of the machine learning model. The machine learning model may be configured to determine the second extent of engagement based on (i) the 2D coordinates of each respective keypoint of the first subset, (ii) for each respective keypoint of the second subset, an indicator that the respective keypoint is not visible in the first 2D image, (iii) the 2D coordinates of each respective keypoint of the third subset, and (iv) for each respective keypoint of the fourth subset, an indicator that the respective keypoint is not visible in the second 2D image.

In some embodiments, the plurality of predetermined body locations may include locations on limbs, locations on a torso, and locations on a head.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   receiving, by a control system of a robotic device and from a camera disposed on the robotic device, (i) a first two-dimensional (2D) image of a body of an actor and (ii) a second 2D image of the body of the actor that has been captured after the first 2D image;
   determining, by the control system and for each respective keypoint of a first subset of a plurality of keypoints, 2D coordinates of the respective keypoint within the first 2D image, wherein the plurality of keypoints represent a corresponding plurality of predetermined body locations, and wherein each respective keypoint of the first subset is visible in the first 2D image;
   determining, by the control system, a second subset of the plurality of keypoints, wherein each respective keypoint of the second subset is not visible in the first 2D image;
   determining, by the control system and for each respective keypoint of a third subset of the plurality of keypoints, 2D coordinates of the respective keypoint within the second 2D image, wherein each respective keypoint of the third subset is visible in the second 2D image;
   determining, by the control system, a fourth subset of the plurality of keypoints, wherein each respective keypoint of the fourth subset is not visible in the second 2D image; and
   determining, by the control system and by way of a machine learning model, an extent of engagement of the actor with the robotic device, wherein the machine learning model is configured to determine the extent of engagement based on (i) the 2D coordinates of each respective keypoint of the first subset and the third subset, (ii) for each respective keypoint of the second subset, an indicator that the respective keypoint is not visible in the first 2D image, and (iii) for each respective keypoint of the fourth subset, an indicator that the respective keypoint is not visible in the second 2D image.

2. The method of claim 1, wherein the machine learning model is configured to determine the extent of engagement further based on, for each respective keypoint of the first subset, an indicator that the respective keypoint is visible in the first 2D image.

3. The method of claim 2, wherein the indicator that the respective keypoint of the second subset is not visible in the first 2D image comprises a binary variable set to a first value, and wherein the indicator that the respective keypoint of the first subset is visible in the first 2D image comprises the binary variable set to a second value.

4. The method of claim 1, wherein the indicator that the respective keypoint of the second subset is not visible in the first 2D image comprises 2D coordinates of the respective keypoint set to a predetermined value that corresponds to a position outside of the first 2D image.

5. The method of claim 1, wherein the machine learning model is trained to determine the extent of engagement based on a plurality of training 2D images of a plurality of actors, wherein each respective training image of the plurality of training 2D images is associated with a label indicating a corresponding extent of engagement, and wherein each respective image is captured by the camera or a second camera disposed on a second robotic device, wherein the second camera approximates a perspective of the camera by being positioned on the second robotic device (i) within a threshold angular displacement relative to an angular position of the camera on the robotic device and (ii) within a threshold height relative to a height of the camera on the robotic device.

6. The method of claim 1, further comprising:
   based on the extent of engagement of the actor with the robotic device, determining one or more operations to perform by the robotic device to interact with the actor; and
   executing the one or more operations.

7. The method of claim 1, further comprising:
   based on the extent of engagement of the actor with the robotic device, determine at least one of (i) a start point of an interaction of the actor with the robotic device or (i) an end point of the interaction.

8. The method of claim 1, wherein the first 2D image also represents a second body of a second actor, and wherein the method further comprises:
- determining, by way of the machine learning model, a second extent of engagement of the second actor with the robotic device;
- comparing the extent of engagement of the second actor with the robotic device to the extent of engagement of the actor with the robotic device; and
- determining, based on results of the comparing, a direction in which to orient the robotic device.

9. The method of claim 1, wherein the extent of engagement of the actor with the robotic device is selected from a group comprising an engaged state, a borderline state, and a disengaged state.

10. The method of claim 9, further comprising:
- determining, based on the extent of engagement of the actor with the robotic device, a transition from a current state to a next state, wherein, when the current state is the borderline state, a probability of transition to the next state is conditioned on a prior state such that (i) when the prior state is the engaged state, the next state is biased towards being the disengaged state and (ii) when the prior state is the disengaged state, the next state is biased towards being the engaged state.

11. The method of claim 9, further comprising:
- when the extent of engagement of the actor with the robotic device comprises the borderline state, causing the robotic device to perform an operation indicating an intent to interact with the actor.

12. The method of claim 1, wherein the first 2D image represents a first subset of the body of the actor, and wherein the method further comprises:
- based on the first 2D image, adjusting a pose of the camera to capture a second subset of the body of the actor, wherein the second subset is greater than the first subset, and wherein the second 2D image represents the second subset of the body of the actor.

13. The method of claim 1, wherein the machine learning model is configured to determine the extent of engagement further based on one or more of: (i) an utterance by the actor detected by a microphone on the robotic device, (ii) a visual indication within at least one of the first 2D image or the second 2D image that the actor is speaking, or (iii) a direction in which a gaze of the actor is pointed.

14. The method of claim 1, wherein the plurality of predetermined body locations comprise locations on limbs, locations on a torso, and locations on a head.

15. A system comprising:
- a robotic device;
- a camera disposed on the robotic device; and
- processing hardware of the robotic device configured to perform operations comprising:
  - receiving, from the camera, a first two-dimensional (2D) image of a body of an actor and (ii) a second 2D image of the body of the actor that has been captured after the first 2D image;
  - determining, for each respective keypoint of a first subset of a plurality of keypoints, 2D coordinates of the respective keypoint within the first 2D image, wherein the plurality of keypoints represent a corresponding plurality of predetermined body locations, and wherein each respective keypoint of the first subset is visible in the first 2D image;
  - determining a second subset of the plurality of keypoints, wherein each respective keypoint of the second subset is not visible in the first 2D image;
  - determining, for each respective keypoint of a third subset of the plurality of keypoints, 2D coordinates of the respective keypoint within the second 2D image, wherein each respective keypoint of the third subset is visible in the second 2D image;
  - determining a fourth subset of the plurality of keypoints, wherein each respective keypoint of the fourth subset is not visible in the second 2D image; and
  - determining, by way of a machine learning model, an extent of engagement of the actor with the robotic device, wherein the machine learning model is configured to determine the extent of engagement based on (i) the 2D coordinates of each respective keypoint of the first subset and the third subset, (ii) for each respective keypoint of the second subset, an indicator that the respective keypoint is not visible in the first 2D image, and (iii) for each respective keypoint of the fourth subset, an indicator that the respective keypoint is not visible in the second 2D image.

16. The system of claim 15, wherein the machine learning model is configured to determine the extent of engagement further based on, for each respective keypoint of the first subset, an indicator that the respective keypoint is visible in the first 2D image.

17. The system of claim 16, wherein the indicator that the respective keypoint of the second subset is not visible in the first 2D image comprises a binary variable set to a first value, and wherein the indicator that the respective keypoint of the first subset is visible in the first 2D image comprises the binary variable set to a second value.

18. The system of claim 16, wherein the machine learning model is trained to determine the extent of engagement based on a plurality of training 2D images of a plurality of actors, wherein each respective training image of the plurality of training 2D images is associated with a label indicating a corresponding extent of engagement, and wherein each respective image is captured by the camera or a second camera disposed on a second robotic device, wherein the second camera approximates a perspective of the camera by being positioned on the second robotic device (i) within a threshold angular displacement relative to an angular position of the camera on the robotic device and (ii) within a threshold height relative to a height of the camera on the robotic device.

19. The system of claim 15, wherein the first 2D image represents a first subset of the body of the actor, and wherein the operations further comprise:
- based on the first 2D image, adjusting a pose of the camera to capture a second subset of the body of the actor, wherein the second subset is greater than the first subset, and wherein the second 2D image represents the second subset of the body of the actor.

20. A non-transitory computer readable storage medium having stored thereon instructions that, when executed by a computing device, cause the computing device to perform operations comprising:
- receiving, from a camera disposed on a robotic device, (i) a first two-dimensional (2D) image of a body of an actor and (ii) a second 2D image of the body of the actor that has been captured after the first 2D image;
- determining, for each respective keypoint of a first subset of a plurality of keypoints, 2D coordinates of the respective keypoint within the first 2D image, wherein the plurality of keypoints represent a corresponding plurality of predetermined body locations, and wherein each respective keypoint of the first subset is visible in the first 2D image;

determining a second subset of the plurality of keypoints, wherein each respective keypoint of the second subset is not visible in the first 2D image;

determining, for each respective keypoint of a third subset of the plurality of keypoints, 2D coordinates of the respective keypoint within the second 2D image, wherein each respective keypoint of the third subset is visible in the second 2D image;

determining a fourth subset of the plurality of keypoints, wherein each respective keypoint of the fourth subset is not visible in the second 2D image; and determining, by way of a machine learning model, an extent of engagement of the actor with the robotic device, wherein the machine learning model is configured to determine the extent of engagement based on (i) the 2D coordinates of each respective keypoint of the first subset and the third subset, (ii) for each respective keypoint of the second subset, an indicator that the respective keypoint is not visible in the first 2D image, and (iii) for each respective keypoint of the fourth subset, an indicator that the respective keypoint is not visible in the second 2D image.

* * * * *